June 9, 1942.  E. E. HORNER  2,285,774
CALCULATING MACHINE
Filed Sept. 21, 1940  2 Sheets-Sheet 1
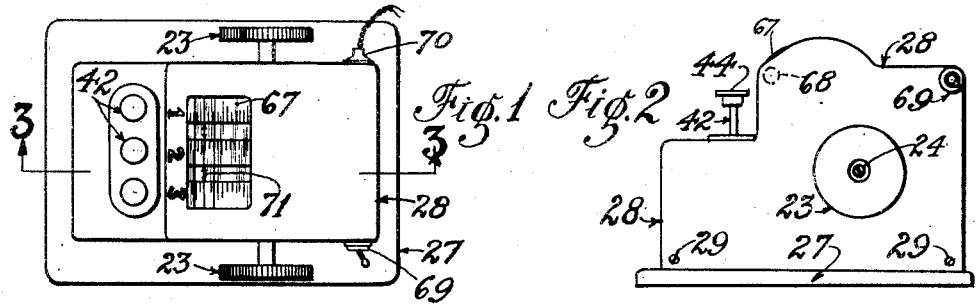
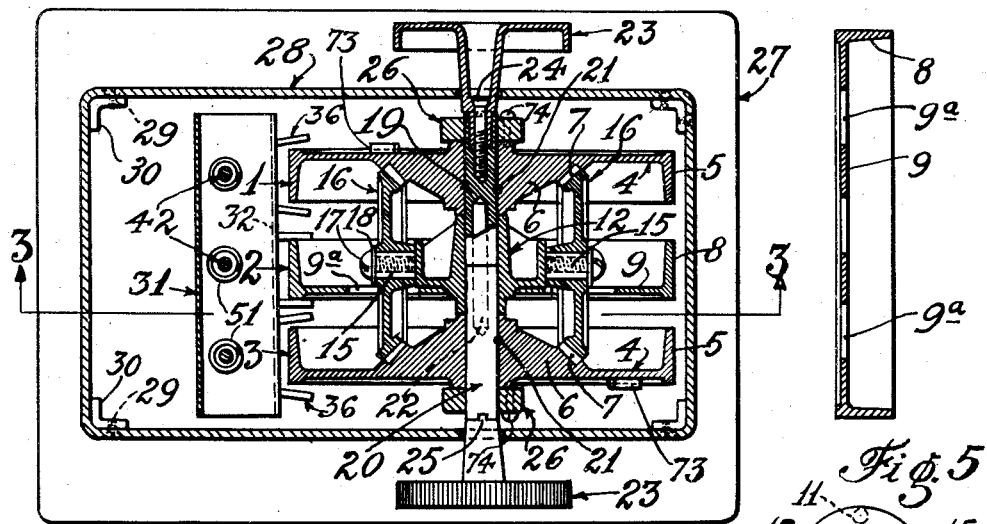
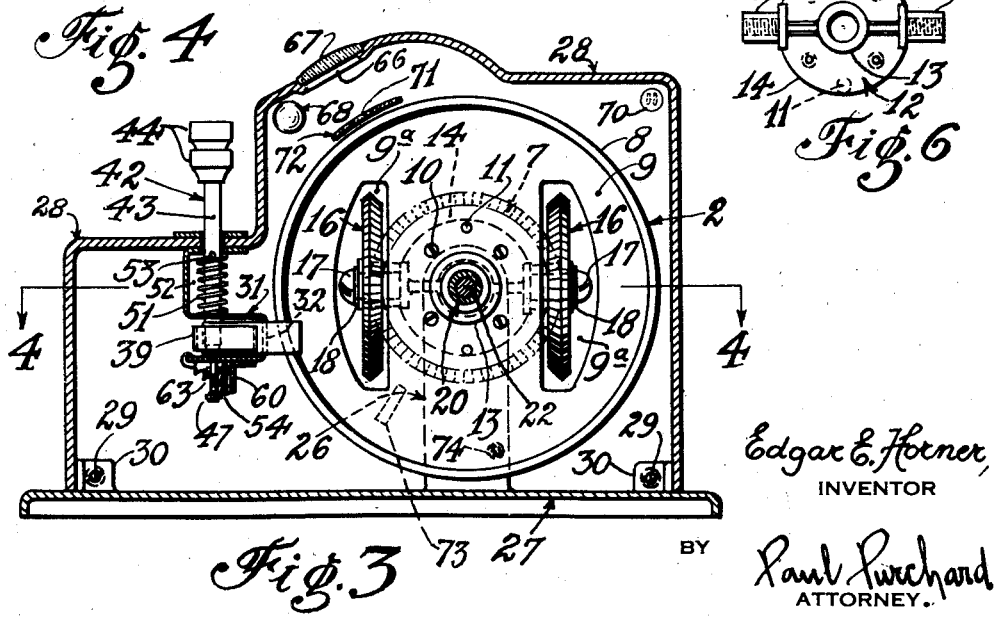
Edgar E. Horner,
INVENTOR
BY Paul Purchard
ATTORNEY.

June 9, 1942.  E. E. HORNER  2,285,774
CALCULATING MACHINE
Filed Sept. 21, 1940   2 Sheets-Sheet 2
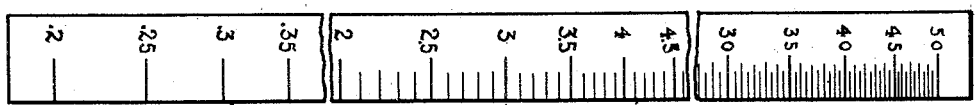
Fig. 16  1 (% Ingredient)
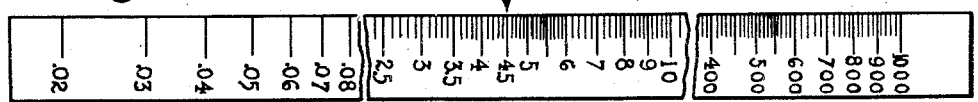
Fig. 17  2 (Amount Ingred't)
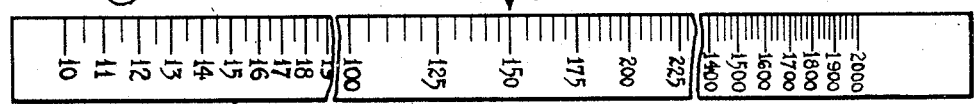
Fig. 18  3 (Amount of Product)
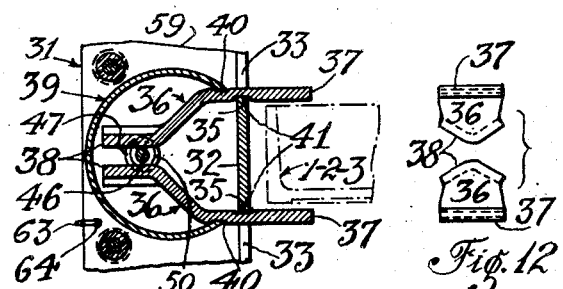
Fig. 11
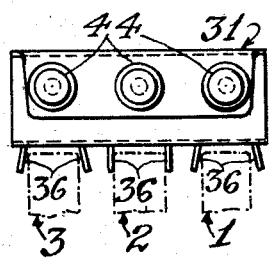
Fig. 12  Fig. 8
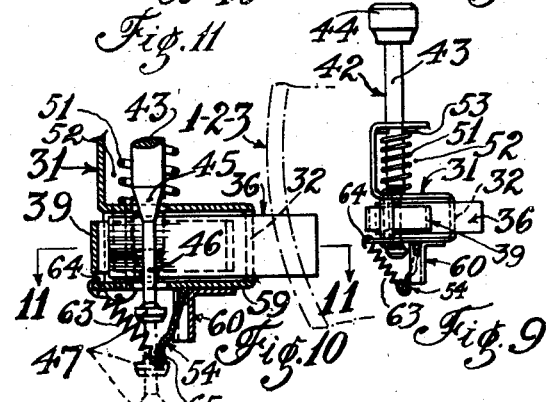
Fig. 10  Fig. 9
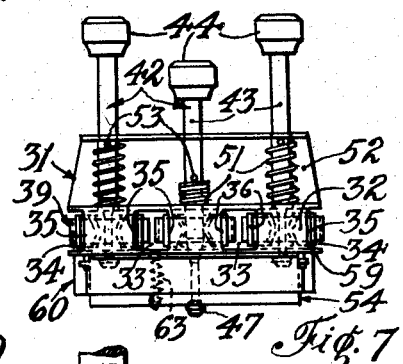
Fig. 7  Fig. 15
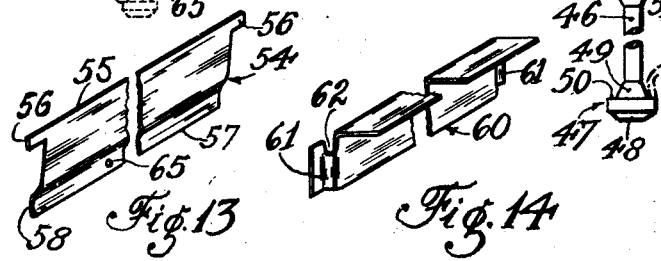
Fig. 13  Fig. 14
Edgar E. Horner,
INVENTOR
BY Paul Purchard.
ATTORNEY.

Patented June 9, 1942

2,285,774

UNITED STATES PATENT OFFICE 2,285,774

CALCULATING MACHINE

Edgar E. Horner, Pittsburgh, Pa.

Application September 21, 1940, Serial No. 357,720

9 Claims. (Cl. 235—79.5)

This invention relates to calculating machines, and more in particular to calculating machines for computing mathematical problems including proportions solved by the so-called "rule of three," which problems are frequently met with in the preparation of compounds or mixtures, such as in the dairy industry, ink-manufacture, etc.

The conventional way of solving such problems is by the slow process of actual figuring on paper or, in order to save time, by using specially made graphic alignment charts comprising three parallel and suitably graduated scales drawn in proper scale relation on paper or card-board.

In such charts, when two known quantities on two separate scales are connected together by an index-line, drawn or imaginary, the intersection of this line with the third scale will give the answer sought. However, since this index-line must be shifted along the scales and its angular relation therewith varies from normal to very acute angles, according to the problem, accurate reading of the scales will become the more difficult and uncertain the more the angle becomes acute. Most accurate readings being possible only when said index-line is practically normal to the scales.

Another great disadvantage of alignment charts is that, in order to offer satisfactory accuracy, the scales must be drawn on paper or cardboard on a fairly large scale. Inasmuch as paper or cardboard are subject to uneven expansion, contraction or to distortion due to atmospheric changes, the accuracy of the scales and their reading is unfavorably affected.

In the calculating machine forming the subject matter of this invention, the index-line is stationary and the scales are movable and interconnected in definite relation. Also, in order to reduce the length of the machine, these scales are positioned on suitable drums, each of which may be independently locked in any desired angular position, so that when calculations involve two or more settings of the scales relative to the index-line, the result of each setting may be maintained for use in subsequent settings. This very important feature is, of course, not readily obtainable in fixed graphic alignment charts, and greatly expedites calculations and assures the accuracy thereof.

One of the primary objects of this invention is to provide a calculating machine which is very simple in construction and operation, which comprises a very small number of parts and which, because of its compactness and reduced weight, may be easily transported by hand from place to place.

Another object of this invention is to provide a machine that is practically fool-proof and which, once properly adjusted, will, with ordinary care, maintain its adjustment permanently.

Yet another object of this invention is the provision of a calculating machine in which the drums bearing the scales may be independently locked, either separately or collectively, and which, when so locked, may be released by actuating but a single locking means.

Additional features and advantages of this invention will appear in the following description considered in connection with the accompanying drawings forming part of this application.

In the drawings:

Fig. 1 is a top plan view of the assembled calculating machine.

Fig. 2 is a side elevation thereof.

Fig. 3 is a vertical sectional view taken substantially on line 3—3 in Figs. 1 and 4.

Fig. 4 is a horizontal sectional view taken on line 4—4 in Fig. 3.

Fig. 5 is a similar view of the center dial of the machine, also taken on line 4—4, Fig. 3.

Fig. 6 is an elevation of the spider-hub for the center dial.

Fig. 7 shows an elevation of the complete locking mechanism for the three dials of the calculating machine.

Figs. 8 and 9 are respectively the top view and the side elevation of Fig. 7.

Fig. 10 is a fragmentary vertical sectional view, on a larger scale, through one of the individual locking means.

Fig. 11 is a horizontal section taken on line 11—11, Fig. 10.

Fig. 12 is an end view of the dial clamp of the locking mechanism.

Fig. 13 is a perspective view of the detent apron of the locking mechanism.

Fig. 14 is a similar view of the hinge and stop-bar for the detent apron.

Fig. 15 is a fragmentary view, on a larger scale, showing the lower part of the push-keys of the calculating machine.

Figs. 16 to 18 are fragmentary views of the developed scales put on the three dials of a calculating machine especially designed for the dairy industry.

Reference being had to the drawings, the calculating machine comprises three coaxially disposed dials 1, 2, and 3, having substantially the shape of cylindrical drums and peripherally graduated to indicate respectively the percentage of ingredient, the total weight or volume of the ingredient, and the total weight or volume of the mixed product.

The two outside dials 1 and 3 are structurally alike (excepting their graduations) and comprise each a drum 4 having a peripheral flange 5 upon which the graduations are placed, and a hub 6 on which is secured, or cast integrally, a bevel gear 7.

The center dial 2 also has a graduated peripheral flange 8, and a disc-like web 9 provided with oblong openings 9ª. To this web is secured by screws 10 and dowels 11 the spider-hub 12 which, as shown in Figs. 4 and 6, comprises the hub proper 13 having a disc-flange 14 and supporting the two diametral trunnions 15.

Upon these trunnions are mounted for free rotation the two compensating bevel gear pinions 16, freely held on the trunnions by means of the screws 17 and the washers 18. These pinions project partly through the openings 9ª and are in constant meshing relation with the two bevel-gears 7 of the oppositely disposed dials 1 and 3.

The three dials are mounted on two coaxial shafts 19 and 20. The dials 1 and 3 are secured on their respective shafts in any desired manner, such as by the tangent pins 21, whereas the spider-hub 12 straddles both shafts and is freely mounted thereon. These shafts are preferably held in proper alignment for independent rotation by means of a dowel-pin 22 engaging both abutting ends of the shafts.

Each shaft may be rotated independently of the other shaft by means of a turn-knob 23 fastened to its corresponding shaft by a screw 24 and the tongue and groove connection 25. Both shafts are rotatably supported in the pedestal-bearings 26 secured to, or formed integrally with, the base 27 of the calculating machine.

Lugs 73, cast directly on the outer dials 1 and 3 and adapted to strike against the stop-pins 74 screwed into the pedestals 26 are used to positively limit the rotation of said dials to substantially one full turn.

It will be noted that the above described dial-assembly is of the differential type, and that the center dial 2 will move angularly half as far as an outer dial, while the other dial is stationary. On the other hand, when both outer dials are rotated equally and simultaneously in the same direction, the center dial will move with them at the same speed.

The dials are protected by a cover 28 mounted on the base 27 and secured thereto by screws 29 engaging corner lugs 30 cast on the base.

The three dials may be individually locked against rotation by means of a friction clamping mechanism illustrated especially in Figs. 7 to 15 incl. As shown therein, the three clamping devices are mounted on a common bracket 31 of substantially S-shaped cross-section, secured at the top, in any desired manner, to the underside of the cover 28. In the lower vertical web 32 of this bracket are cut out apertures 33 and 34, the vertical edges 35 of which act as fulcrums or pivots for the dial clamps.

Each dial clamp comprises two similar clamping elements 36, having at one end a straight clamping-finger 37 adapted to laterally and frictionally engage the peripheral flange of a dial, and at the other end an inwardly beveled wedge-finger 38. Two coacting clamping elements are held in proper position about their pivotal edges 35 by means of a split-ring-spring 39 which outwardly engages said elements and normally holds them in non-clamping position. These elements are preferably grooved transversely, as at 40 and 41, to insure a more definite engagement with said spring and the edges 35, respectively.

Each dial clamp is forced into dial clamping position by means of a push-key 42 comprising a main stem 43, having at the top a push-knob 44 and at the bottom a downwardly converging frusto-conical portion 45 adapted to engage and gradually separate the two wedge-fingers 38 of a dial clamp. This conic portion has a reduced axial shank 46, terminated by a lock-head 47 having at the bottom a downwardly converging conic portion 48 which facilitates its insertion between the wedge-fingers, and having at the top a smaller upwardly converging cone 49 producing on the lock-head a flat annular rim 50, the purpose of which is explained hereafter.

A compressed coil-spring 51 is placed around the stem, within the upper bight 52 of the bracket 31 to act against a stop-pin 53 driven through the stem and serving to limit the upward travel of the push-key, under the influence of its spring 51.

It will be readily seen from the drawings that, when a key is pushed down, the cone 45 will separate the wedge-fingers 38 of its clamp, and thus force the clamping-fingers 37 against the sides of the corresponding dial, thus frictionally holding same against rotation, as long as the push-key is down.

When solving rule of three problems with this calculating machine, it is necessary to set and lock the dial having one known quantity upon which the problem is based, and to then set one of the other dials to the other known quantity, in order to obtain the unknown quantity or result on the third dial.

In extensive calculations, involving more than one solution by the rule of three, it may become necessary to set and lock the third dial, or either one of the other dials to another known quantity. In any case, only one dial should be locked and the other two dials left free to rotate to solve a proportion.

In the locking mechanism shown in Figs. 7 to 15 incl., each push-key is held in dial locking position by means of a common detent-apron 54, having at each end of its upper edge 55 a flat pivot-pin 56, and having at its lower edge 57 a suitably shaped and offset bend 58 facing the push-keys. The upper edge 55 of this apron bears rockably against the lower flange 59 of the bracket 31 and is pivotally held by the angular, sheet metal, backing bar 60, which is parallel to the apron and secured to said bracket in any desired manner, such as by spot-welding. The ends 61 of this backing-bar are bent substantially at right angles to the main body thereof and are provided with slots 62 of suitable width to receive the flat pivot pins 56 and limit their angular movement.

The lower edge 57 of the detent-apron 54 is normally urged toward the push-keys by means of a tension-spring 63, one end of which is fastened, at 64, to said bracket and the other end, at 65, to the apron proper.

When one of the push-keys is depressed, the conic part 45 of the shank 43 will force the clamping fingers 37 into dial locking position. Also, the lock-head 47 will, in its downward movement, first rock the detent-apron 54 counterclockwise (Fig. 10) until its head passes beyond the lower edge 57 of the apron, the latter being then swung back toward the shank 46 by the detent-spring 63. Upon releasing the pressure on the push-key, its spring 51 will force it upwardly until the flat 50 on the lock-head strikes the lower edge of said apron and is locked thereby against further upward travel.

To release this locked dial, it is only necessary to push down one of the free push-keys just far enough so that its lock-head will force the detent-apron away from the head of the locked push-key, which latter will then be forced up by its spring 51.

If, for some reason, the solution of a lengthy problem has to be interrupted before it is solved, or to prevent rotation of the dials in shipment, the calculating machine may be completely locked temporarily by simultaneously pressing down all the push-keys into locked relation with the detent-apron 54. When the user is again ready to resume his interrupted task, he simply depresses either one of the push-keys as far as it will go, (as shown by the lowermost position of said key in dotted lines, Fig. 10). Then, he suddenly releases said key, whereby the fast upwardly moving cone 49 will throw the lower edge 57 of the detent-apron away from all the lock-heads, as far as the backing-bar 60 will permit, thus enabling the push-keys to snap into raised position.

The setting and reading of the scales on the dials is effected through a window 66 having a glass-pane 67, preferably of the magnifying lens type.

To enable the use of this machine in dark places, it is provided with a suitably shaped and located electric light bulb 68, controlled by an electric switch 69 and connected to a local electric circuit by a plug and socket connection 70.

An index-line 71 (Figs. 16-18), for accurately setting and reading the dials, is drawn directly on the glass-pane 67 or, preferably, on a transversely disposed transparent shield 72 (Fig. 3), supported in any desired and suitable manner closely over the three dials.

The number of problems which can be solved, wholly or partly, with this machine is, of course, unlimited. For example, the relative position of the scales on dials 1, 2 and 3 shown in Figs. 16 to 18, corresponds to the solution of three simple problems occurring frequently in the dairy industry, for instance.

Thus, if a dairyman wants to figure out how many pounds of butter fat he can obtain from 150 lbs. of milk of three per cent butter fat, he proceeds as follows: Turns dial 1 by means of the turn-knob 23 until the number "3" registers exactly with the index-line 71. Dial 1 is then locked by depressing its push-key 42 and dials 2 and 3 are rotated by turning the knob 23 connected to dial 3, until the reading 150 on the latter appears directly under the index-line. The reading 4.5 on dial 2 then appearing under said line will give the amount of butter fat which can be obtained from that particular batch of milk.

On the other hand, if the dairyman desires to ascertain how many pounds of 3% butter fat milk are needed to produce 4.5 lbs. of butter fat, he would first set and lock dial 1 to read 3% and then turn the knob 23 of dial 3 until the other known quantity, i. e. 4.5 lbs. appears on dial 2; the reading 150 lbs. on dial 1 would then appear as the answer to this problem.

Again, if the dairyman is able to extract 4.5 lbs. of butter-fat from 150 lbs. of milk, he would find, by analogous manipulation of the dials, that the average butter-fat contents of the milk was 3%.

The above three examples entail the solution, at one setting, of simple proportions which could also be solved, more or less accurately, on an ordinary drawn graphic alignment chart. However, when the problems are more complex and include intermediate results which must be carried over into subsequent calculations, the possibility of locking my calculating machine at these intermediate results insures both greater accuracy and speed of calculation.

Again referring to the dairy industry, the following illustrative example of this type of problems is given: "Assuming that it be required to reduce 1250 lbs. of 5% butter-fat-milk to a milk of only 3.8% butter-fat, by the addition of skim-milk (fat free), how many pounds of milk containing 3.8% butter fat will be obtained?"

This problem is solved on the calculating machine as follows: "Set and lock dial 3 on 1250 lbs., and set dial 1 on 1.2% (which is the difference in the butter-fat percentages available and required); this brings dial 2 on 15 lbs. which, in this case, is the excess butter-fat which must be reduced down to 3.8% by the addition of an amount of skim-milk, which is thusly determined: Lock dial 2 on 15 lbs. and turn dial 1 to 3.8%, whereby dial 3 is brought to approximately 395 lbs., which is the amount of skim-milk to be added to the original 1250 lbs. of 5% butter-fat-milk; thus making a total of 1645 lbs. of 3.8% butter-fat milk."

While in the foregoing I have shown and described a calculating machine especially designed for the dairy industry, it is evident that its application is not limited thereto, but that, by employing suitable scales on the various dials, the machine may be used for the solution of similar problems occurring in many other industries.

As will be understood, there may be changes made in the construction and arrangement of the details of my invention without departing from the field and scope of the same, and I intend to include all such changes, as fall within the scope of the appended claims, in this application, in which the present form of my invention is disclosed.

I claim:

1. In a calculating machine, three coaxially disposed rotatable parallel drums; graduations thereon; differential gear means to connect said drums for rotation in differential space relation; a turn-knob directly connected to each outer drum to manually rotate same independently of the other outer drum; a depressible spring controlled lock-key for each drum, said lock-keys locking in depressed position to lock the corresponding drums in selected position, and means actuated by depressing any unlocked key and adapted thereby to release any locked drum.

2. In a calculating machine, three coaxially disposed rotatable parallel drums; graduations positioned thereon; differential gear means to connect said drums for rotation in differential space relation; a turn-knob directly connected to each outer drum to rotate same and the center drum independently of the other outer drum; a clamping means for each drum to lock same in selected position; three push-keys, one to force each clamping means into drum locking position; means to hold each push-key in drum locking position, and means operable by depressing an unlocked push-key to release the locked push-keys and corresponding drums.

3. In a computer, the combination with three coaxial equiradial rotatable annular bands having mathematical scales thereon, a fixed index traversing all three of said scales, and gear means coordinating the rotation of said bands relative to each other whereby any value indicated by said index on any of said scales is a function of the values simultaneously indicated by said index on the two other scales; of three locking means, one for each of said bands; three keys, one for operating each of said locking means; means for locking said keys in depressed position; and means for releasing locked keys, said releasing means being actuated by depressing an unlocked key.

4. In a calculating machine, the combination with a plurality of rotatable annular bands having mathematical scales thereon, an index traversing said scales, and gear means coordinating the relative rotation of said bands according to a predetermined mathematical law; of locks for each of said bands, an individual key for operating each of said locks, means for locking each key in lock-operating position, and means for unlocking locked keys, said unlocking means being actuated by operating an unlocked key.

5. In combination in a calculating machine, a plurality of rotatable graduated elements, locks therefor, a plurality of keys, each key controlling the locking of one of said graduated elements, means for locking said keys to lock said graduated elements, and means actuated by operating an unlocked key to unlock the locked keys and graduated elements.

6. In combination in a computer, a plurality of rotatable graduated elements; a plurality of locks therefor, one for each graduated element; a plurality of keys, one to operate each of said locks; means operating, when a key is operated, to lock said key in lock-operating position, thereby locking the graduated element associated with said key; and means operating, when said key is operated, to unlock the other keys and the graduated elements associated therewith.

7. In a computer, the combination with a rotatable annular band having scale graduations on the face thereof, of band-locking mechanism comprising a pair of clamping elements adapted frictionally to engage opposite edges of said band, spring means normally maintaining said clamping elements out of engagement with said band, a push-key adapted to engage said clamping elements with said band, means for locking said push-key in band-locking position, spring means tending to maintain said push-key out of band-locking position, and means for unlocking said push-key.

8. In a calculating machine, a pair of rotatable shafts aligned end to end, means for independently rotating each of said shafts, a pair of drums, each drum being fixed to one of said shafts, a pair of gears, each gear being fixed to one of said drums, a third drum floating upon said shafts between the aforesaid drums, a pair of diametral trunnions fixed to said middle drum perpendicular to said aligned shafts, a pair of compensating pinions, each pinion being rotatably mounted on one of said trunnions and arranged simultaneously to engage both of said gears, and a fixed index traversing all three of said drums, the rims of all of said drums being parallel to each other, the rim of each drum having a scale thereon, said scales being arranged on said rims in nomographic relationship whereby any value indicated by said index on any scale is a function of the values simultaneously indicated by said index on the two other scales.

9. In a calculating machine having a plurality of cooperating coaxial calibrated drums, drum-locking mechanism comprising a bracket; a plurality of clamps supported by said bracket, each of said clamps being arranged frictionally to engage opposing edges of the rim of one of said drums without contacting the calibrated surface of said rim; spring means normally maintaining said clamps out of contact with said drums; a plurality of keys, each controlling the engagement of one of said clamps with one of said drums; means for locking said keys in clamp-engaging relation; and means operating, upon actuation of an unlocked key, to unlock the locked keys.

EDGAR E. HORNER.